United States Patent [19]

Brotzmann et al.

[11] Patent Number: 4,798,624

[45] Date of Patent: Jan. 17, 1989

[54] METHOD FOR THE MELT REDUCTION OF IRON ORES

[75] Inventors: Karl Brotzmann; Hans-Georg Fassbinder, both of Sulzbach-Rosenberg, Fed. Rep. of Germany; Richard E. Turner, deceased, late of Applecross, Australia, by Trenna R. Turner, executor

[73] Assignee: Kloeckner CRA Technologie GmbH, Duisburg, Fed. Rep. of Germany

[21] Appl. No.: 23,369

[22] Filed: Mar. 9, 1987

[30] Foreign Application Priority Data

Mar. 8, 1986 [DE] Fed. Rep. of Germany ....... 3607775

[51] Int. Cl.[4] .................... B23K 7/10; C21B 13/00
[52] U.S. Cl. ................................. 75/38; 266/176
[58] Field of Search ........................... 266/176; 75/38

[56] References Cited

U.S. PATENT DOCUMENTS 2,894,831  7/1959  Old .................................. 266/176

Primary Examiner—Peter D. Rosenberg
Attorney, Agent, or Firm—Armstrong, Nikaido, Marmelstein & Kubovcik

[57] ABSTRACT

A method for the melt reduction of iron ores, in which iron oxide in the liquid state is substantially reduced and the energy required for the heat balance of the process is generated by adding carbonaceous fuels to the melt and by afterburning the resulting reaction gases, mainly CO and $H_2$. The reaction gases are afterburned successively two or more times in oxygen-containing gas jets that blow into reaction spaces which are effectively independent of each other.

17 Claims, 3 Drawing Sheets

METHOD FOR THE MELT REDUCTION OF IRON ORES

FIELD OF THE INVENTION

The present invention relates to a method for the melt reduction of iron ores, in which the iron oxide is reduced substantially in the liquid state and the energy required for the heat balance of the process is generated by feeding carbonaceous fuels to the melt and by afterburning the resulting reaction gases, mainly CO and $H_2$.

BACKGROUND OF THE INVENTION

A number of methods are already known in which prereduced ore is melted down together with coal and the resulting gas utilized to reduce fresh iron ore.

The process according to German "offenlegungsschrift" No. 31 33 75 improves the heat supply in the melt-down vessel by having reaction gases from the iron melt sucked in in the space above the melt by oxygen blown onto the bath surface, with the reactor gases carried along to the bath surface and partly burned, with the resulting heat transferred to the iron melt. In this known method liquid iron is produced by the addition of ore to the iron bath reactor. The carbonaceous gas formed at the same time can be used to prereduce ore. However, the fuel consumption in this method is relatively high.

The process according to German Pat. No. 28 43 303 involves the same disadvantage. In this process lumpy coal is fed to a fluidized bed located on the iron bath and the gases serve to prereduce iron ore. To produce 1 t of liquid iron from the ore prereduced in the gaseous phase to a high degree of metallization, approximately 900 kg of high-quality coal is required. However, this process produces a considerable surplus of gas whose exploitability essentially determines the economy of the process.

German "offenlegungsschrift" 34 18 085 describes a method for producing iron from ore, in which the ore is reduced in an ore reduction vessel to a metallization degree of approximately 50% with the reaction gases from the melt-down vessel. In this process the reaction gases emerging from the iron melt are afterburned in the melt-down vessel by 30 to 40%, and the resulting heat is transferred to a large extent to the melt. The reaction gases are then reduced and at the same time cooled on the way from the melt-down vessel to the ore reduction vessel, by the addition of reducing agents such as natural gas or dust coal.

Another known method uses substantially prereduced iron ore with a metallization degree of 92 to 94%, which is melted down in the melt-down vessel together with carbonaceous, solid energy carriers and oxygen. The resulting gas serves to prereduce the ores and, to improve its utilization, the gas is circulated and the $CO_2$ therein removed.

The latter two methods thus combine three steps to arrive at a minimum fuel consumption, i.e. the melt reduction with afterburning, hot gas reduction of the waste gases from the melt-down vessel, and prereduction of the ores in the gaseous phase, on the one hand, and melting down with coal and oxygen without afterburning, utilization of the gases for prereduction, and removal of the $CO_2$ during the gas recycling, on the other hand. These processes require approximately 600 kg of coal to produce 1 t of iron from iron ore.

SUMMARY OF THE INVENTION

The present invention is based on the problem of providing a method that requires a small proportion of energy from an external source, e.g., carbonaceous fuels.

The inventive method solves this problem by afterburning the reaction gases successively two or more times in oxygen-containing gas jets that blow into reaction spaces which are effectively independent of each other.

The term "effectively independent reaction space" refers to the space from which one oxygen-containing gas jet sucks in gas from the surroundings for afterburning substantially independently of the other gas jet(s). These reaction spaces are usually disposed one behind the other in the direction of flow of the reaction gas. That is, one of the reaction spaces will normally be downstream of the other reaction space, with reference to the direction of flow of the reaction gases, and will be beyond the area of direct influence of the other reaction space.

DETAILED DESCRIPTION OF THE INVENTION

According to the invention the reaction gases are afterburned at least a second time by being again sucked into an oxygen-containing combustion gas after the first afterburning step, and most of the resulting energy is used for melt reduction, for example to melt the ground ores introduced, wherein the iron ore is preferably prereduced to the wustite stage.

An advantageous embodiment of the present invention consists in having less reducing conditions exist at the point of impact on the melt surface of the second afterburning gas jet than at the point of impact on the melt surface of the first afterburning gas jet. In order to obtain a high degree of afterburning in the second step, the reduction potential thereof should be lower compared to the point of impact of the first afterburning gas jet, since the gas jets generally have a high degree of oxidation and probably react with the liquid phase in the melt-down vessel.

According to the invention, the reaction spaces in which the gas jets act may comprise two separate, but directly connected vessels. For example, the first reaction vessel may be a drum type converter which is connected with the second reaction vessel, for example a melting cyclone. Surprisingly enough, however, it has been shown that even in one vessel the reaction spaces of the afterburning gas jets can be kept separate in such a way as to allow for two-stage afterburning of the reaction gases. It is an essential feature of the present invention that the reaction gases are afterburned successively two more more times in oxygen-containing gas jets that blow into reaction spaces which are effectively separate from each other.

According to the invention, the following measures have a favorable effect during the operation of the melt-down reactor on the reliable adjustment of the two-stage afterburning in the same vessel and the achievement of a high total afterburning degree, as well as the reliable retransfer of the generated heat to the melt. The bath agitation should be set by the amount and type of the introduced reaction materials and/or circulation gas so as to be clearly greater at the point of impact of the first afterburning gas jet, i.e. the area with high reduction potential, than at the point of impact of the second or further afterburning gas jets. The first afterburning gas jet hits the surface of the iron bath in an area where metal splashes mainly occur. The second afterburning gas jet, however, comes in contact to a large extent with the slag on the melt, which has a negligible reducing effect on the almost completely burned gas.

It has further proved advantageous to make the bath depth in the first reaction space, having a larger reduction potential, larger than in the second reaction space. It is particularly favorable if virtually no iron bath is left under the second reaction space, but only liquid slag.

The ground ore can be supplied according to the invention partly or completely in the second reaction space. In the liquid phase, i.e. in the melt, a sufficient concentration transfer and mass transfer should take place between the two reaction spaces. The vigorous bath agitation in the first reaction space usually suffices for this purpose.

The energy carriers, mainly the carbonaceous fuels, are advantageously supplied to the melt in the area of the first afterburning reaction space, in which the reaction gases are subject to the first afterburning. However, the oxidized substances, like the ore to be reduced, are advantageously added in the second reaction space, in which the second afterburning gas jet takes effect.

According to the invention the afterburning gas jets may be disposed differently in their respective reaction spaces. To achieve an optimum degree of afterburning, the nozzle diameter and the distance traversed by the gas are of crucial importance. For example, the afterburning gas jets can be directed at the bath at right angles. However, in order to achieve a longer distance for them to traverse, an oblique arrangement may be preferred. The primary and secondary afterburning gas jets can be directed parallel to each other, but an opposed inclination may provide better conditions for afterburning with respect to the geometry of the meltdown reactor.

Low consumption values for energy carriers and thus a high degree of economy of the method can be obtained according to the invention by an afterburning degree of 30 to 50% in the first reaction space and 60 to 100% in the second afterburning stage. In addition to the already-mentioned measures it has proved useful to use preheated air, i.e. a hot air blast, as an oxygen-containing gas to achieve the high afterburning rates. Surprisingly enough, in the inventive method the use of a hot air blast as an oxygen carrier does not cause any undesirable overheating in the gas space of the meltdown reactor. The hot air blast can be replaced temporarily and/or locally by oxygen or any desired mixtures of oxyen and preheated air.

When the waste gas leaves the melt-down reactor (or the above-mentioned combined reaction vessel with two reaction spaces) or immediately thereafter, it is preferably cooled and at the same time reduced by the addition of reducing agents, such as powdery coal or natural gas, so that the caloric content is clearly increased. It is possible to treat only part of the waste gas stream in this manner. In an advantageous embodiment of the invention part of the waste gas stream is taken out of the first reaction space and reduced in the stated way in order to preheat the air for the process using this gas.

According to the invention, a cross exchange of the substances in the liquid phases beneath the two reaction spaces is advantageous since this also involves, for example, a balance of the energy between the reaction spaces. However, this cross exchange in the liquid phase is not absolutely necessary for the performance of the inventive method. The method can also be practised in such a way that the iron oxide is melted down in a second, connected reaction vessel which is separated from the first system in its liquid area, with the iron oxide being decomposed thermally into wustite and melted, and this melt then fed to the reaction space in the first vessel.

If the fine-grained ore is blown in with the second afterburning gas jet, it may be useful to improve the exploitation of heat by introducing the ore into the second afterburning gas jet in such a way that it is simultaneously heated as well. In order to achieve this, a grain size up to 0.3 mm and an even distribution of the ground ore within the second afterburning gas jet have proved useful. According to the invention the even distribution of the fine ore can be obtained if it is blown in at a velocity as low as possible, of approximately 50 to 200 m/sec, in order to promote turbulence in the gas jet at the point of introduction.

The invention shall now be explained in more detail with reference to schematic drawings and non-restrictive exemplary information.

Figure 1:
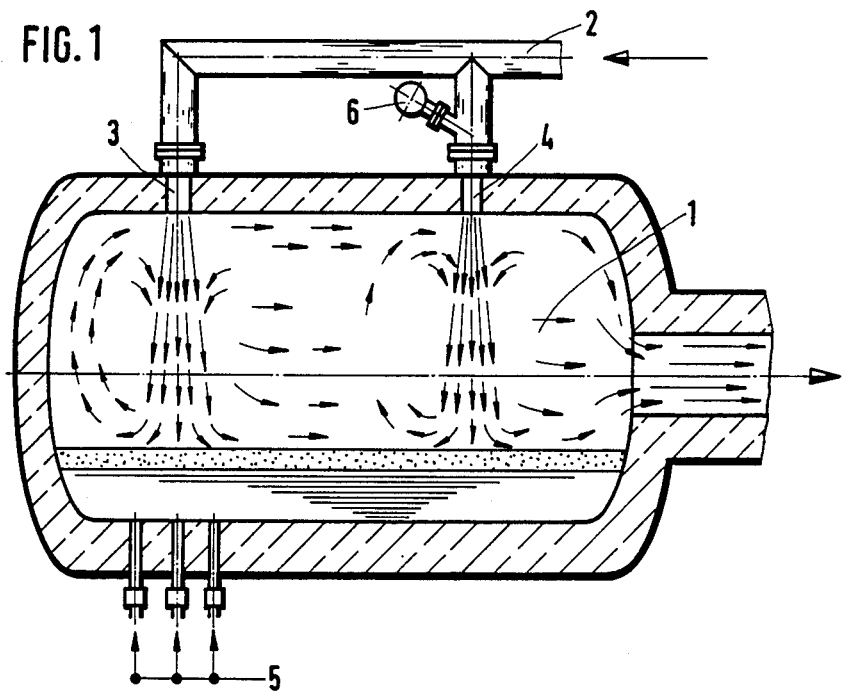
FIGS. 1 and 2 show longitudinal cross-sections of a drum-shaped melt-down reactor with different arrangements of the top blowing means.

Drum-shaped melt-down reactor 1 is generally symmetrical about its axis of symmetry. The hot air blast is supplied to two tuyeres 3 and 4 via conduit 2. The afterburning gas jets are directed onto the bath surface from above. A first reaction space is formed below top blowing aperture 3 and the second reaction space below top blowing aperture 4. The carbonaceous fuels, mainly coal dust, are fed to the melt through nozzles 5. Other ways of supplying the coal, for example top blowing, are also possible. The ground ore is blown in via feed conduit 6 together with the second afterburning gas jet via aperture 4. The gas flow in melt-down reactor 1 is shown by arrows. As can be seen in FIG. 1, the two reaction spaces are effectively independent of each other, i.e. substantially separate in the gaseous phase, because the top blowing jets show high stability.

Figure 2:
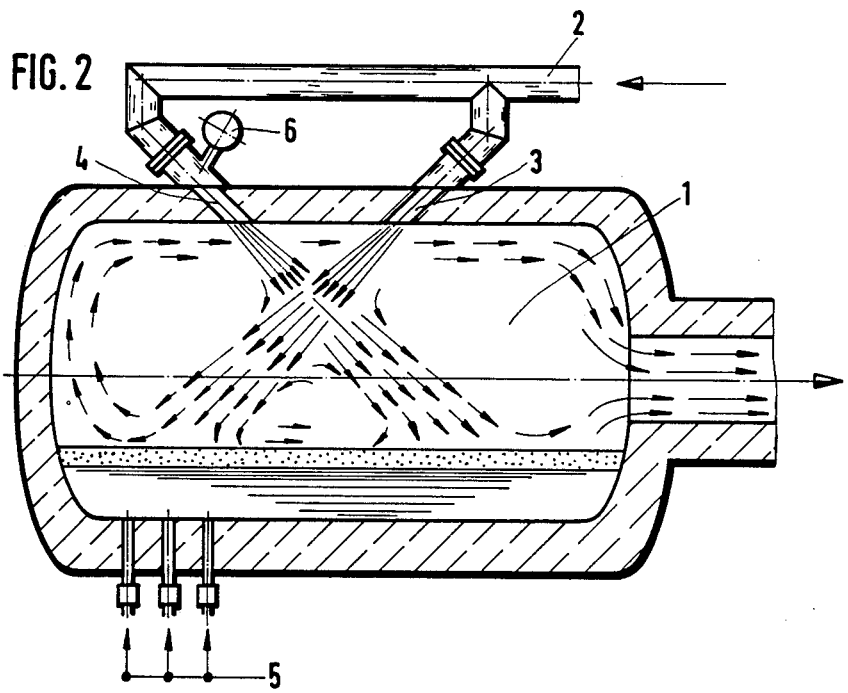

This stability of the afterburning gas jets together with the fact that no great amounts of gas are sucked in in the upper area, i.e. in the immediate vicinity of the top blowing aperture, can be exploited by having the two afterburning gas jets opposed so that they blow toward each other in the upper area, as shown in FIG. 2. However, the nozzles must be disposed in such a way that the gas jets do not intersect in space.

Figure 3:
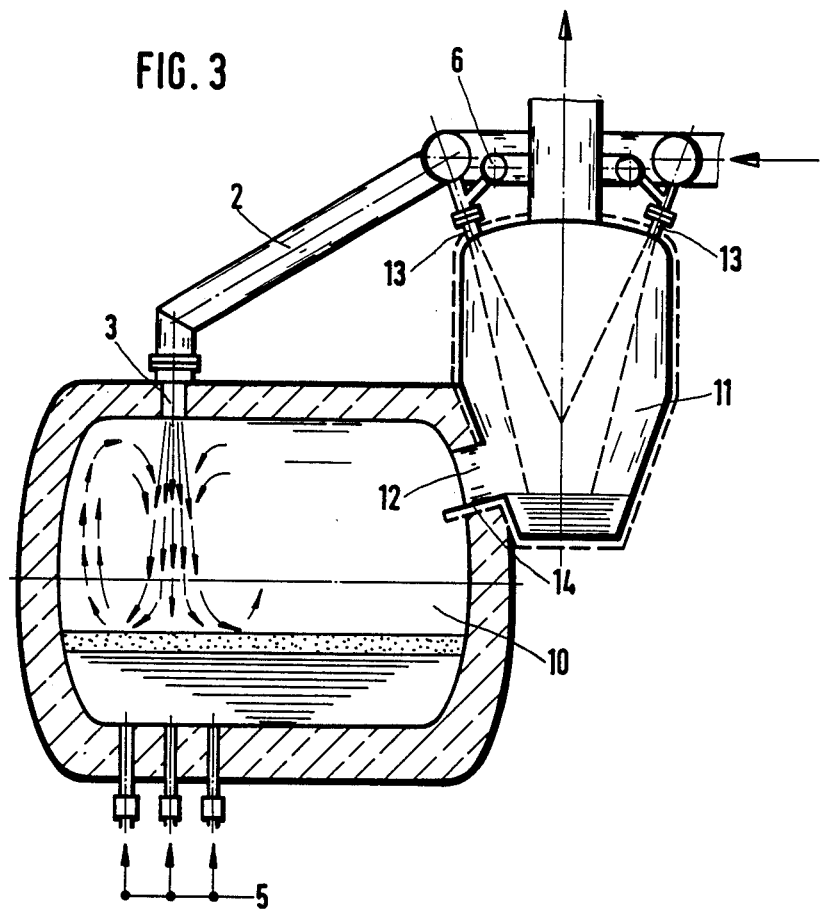
FIG. 3 shows a longitudinal cross-section of a melt-down reactor with a second reaction vessel connected thereto.

The hot air supplied through tuyeres 3 and 4 will be at a temperature of 800° to 1500° C., preferably 1100° to 1300° C., and it will be at a velocity of 100 to 300 meters per second, preferably 150 to 250 meters per second. The coal dust or other carbonaceous fuel supplied to the melt through nozzles 5 is entrained in an inert gas, such as nitrogen, argon, or the like. The ground ore which is blown in through conduit 6 will normally be entrained in hot air or in waste reaction gases. The tuyeres 3 and 4 will normally be separated by a distance of at least 2 meters. The amount of coal supplied to the reactor will vary depending upon the heat requirement of a given system, and can be readily determined by those of ordinary skill in the art. A variant of the inventive method with a melt-down reactor 10, having a first reaction space, and a second reaction space 11 connected thereto, is shown in FIG. 3. In this case the liquid phase is also located in two separate reaction spaces. The waste gases from first reaction space 10 reach via aperture 12 a water-cooled second reaction space 11. In reaction space 11 the waste gases from melt-down reactor 10 are burned by the two afterburning gas jets from nozzles 13. At the same time the ore that is supplied to nozzles 13 through feed conduit 6 is melted down and reduced thermally to FeO. The molten wustite runs via water-cooled channel 14 into the first reaction space, i.e. the melt-down reactor. The liquid wistite thus flows to the melt in the first reaction space without coming in contact with the refractory material lining melt-down reactor 10.

The hot air blast supplied through tuyere 3 and nozzles 13 will normally have a temperature of 800° to 1500° C., preferably 1100° to 1300° C., and will be at a velocity of 100 to 300 meters per second, preferably 150 to 250 meters per second. Similar to the embodiments of FIGS. 1 and 2, the amount of coal supplied will vary depending upon the heat balance of the system, and can readily be determined by those in the art.

Figure 4:
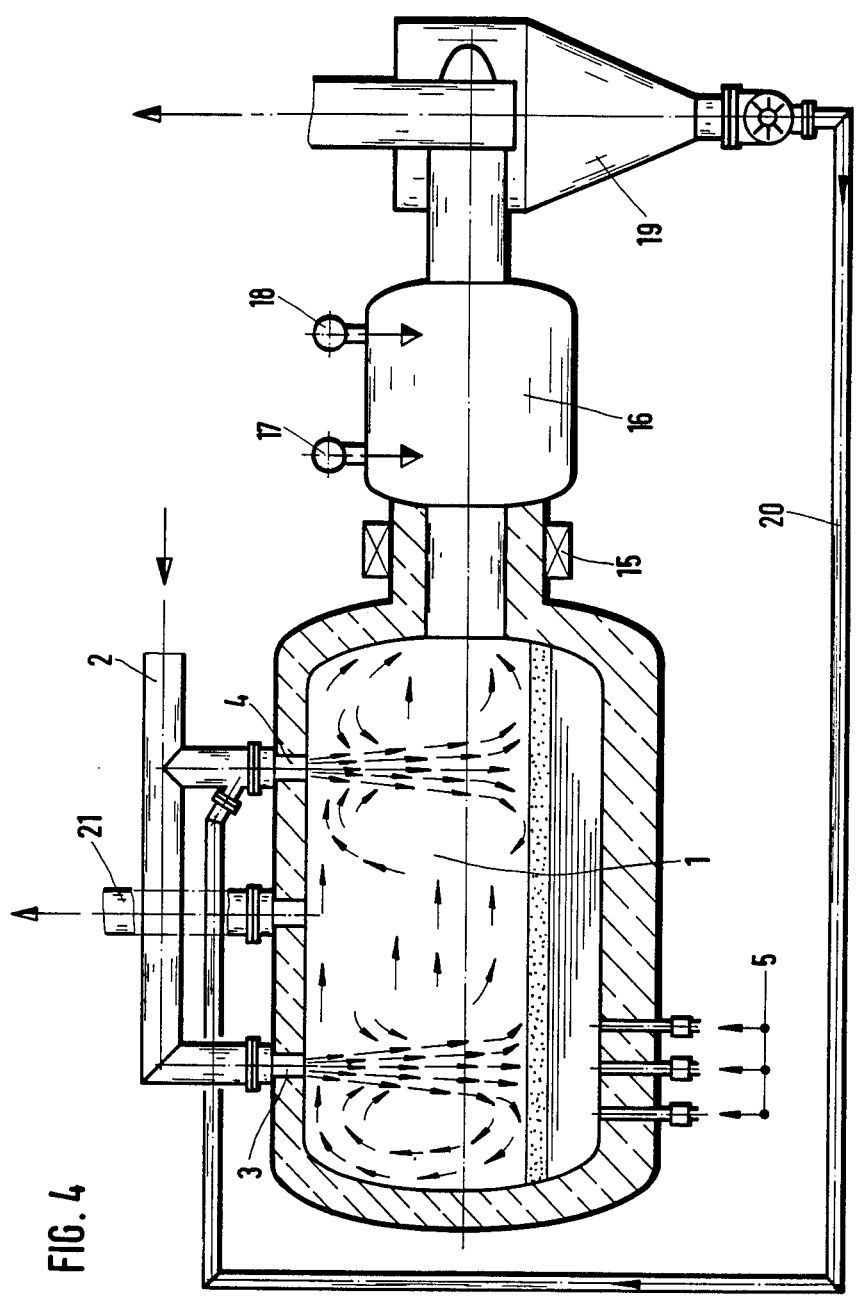
FIG. 4 shows a longitudinal cross-section of a drum-shaped melt-down reactor with a cooling chamber for the waste gases connected on the outlet side and associated with an adjacent cyclone.

FIG. 4 shows a further embodiment of the present invention. The waste gases from melt-down reactor 1 flow through rotary leadthrough 15 and are cooled in the directly adjoining cooling chamber 16 by the addition of limestone via feed conduit 17 and fine ore via feed conduit 18. At the same time these powdery substances absorb the metal droplets contained in the waste gas. In a particularly advantageous embodiment of the invention, limestone and ore are supplied successively to cool off the gases. This means that the deacidification of the limestone takes place quickly at high temperatures and the ore is then heated. After cooling, the powdery substances are separated out hot in a cyclone 19. The gas-solid mixture can optionally be cooled down even further before separation. It has proved useful for this purpose to add recirculated waste gas before cyclone 19. The mixture of preheated ore (approximately 700° C.) and lime is then fed out of cyclone 19 via conduit 20 into the afterburning gas jet of top blowing means 4. Part of the waste gas current can be fed directly out of the meltdown reactor via conduit 21 to a waste heat boiler, and this portion of the gas can be utilized, for example, for producing the hot air blast.

The process parameters of the materials introduced into the reactor of FIG. 4 are similar to those described above for FIG. 1. To produce one ton of iron, approximately 600 kg of coal, will be introduced through underbath nozzles 5. The ore and limestone introduced through feed conduits 17 and 18 will be in the amount of approximately 1600 kg/t of iron, and approximately 200 kg/t of iron, respectively.

EXAMPLES OF THE INVENTION

EXAMPLE 1

To produce 1 t of iron, 550 kg of a gas-flame coal with approximately 33% volatile components and a caloric power Hu of 7200 kcal/kg is blown via underbath nozzles 5 into a melt-down vessel similar to that of FIG. 4. As further support for the heat transmission from the afterburning gas jet in the first reaction space, approximately 5% of the total amount of ore can additionally flow through nozzles 5. Via tuyere 3 1800 m³ of hot air blast at a preheating temperature of approximately 1200° C. is blown in. In the first reaction space an afterburning degree of 40% can then be obtained, i.e. the waste gas which leaves reaction space 1 toward the gas outlet has on the average an oxidation degree of 40%. In the second reaction space, another 800 Nm³ of hot air blast with the same temperature is blown in through tuyere 4, so that the total afterburning degree obtained is 80%. Together with this afterburning gas jet in the second reaction space, ore and lime, both preheated to approximately 700° C., are also blown onto the bath. This gives rise to a waste gas volume of 2100 m³ with a sensible heat content of 1.3 Gcal and a chemical, i.e. latent, heat content of 0.4 Gcal. This waste gas is cooled immediately after traversing rotary leadthrough 15 by the addition of the remainder of the ore and the total amount of limestone of approximately 300 kg/t of iron. An average temperature of approximately 1200° C. results. To lower the temperature further to approximately 800° C., approximately 500 Nm³ of recirculated waste gas is added directly before the cyclone.

EXAMPLE 2

A further example to explain the present invention relates to a particularly simple variant of the method.

In an elongated, drum-shaped melt-down reactor with outer dimensions of approximately 10 m (length) and 6 m (diameter) and a 60 cm thick refractory lining, approximately 60 t of liquid iron is produced per hour. In the first reaction zone approximately 600 kg/t of iron of a gas-flame coal is fed to the iron bath through underbath nozzles. The entire amount of oxygen required for the combustion of the carbon is blown onto the bath surface in the first reaction space in more or less even distribution through six nozzles as free jets with a run length of approximately 5 m. It has proved useful to improve the afterburning degree by introducing approximately 5% of the total amount of ore below the bath surface in the area of the first reaction space.

The waste gas passes through the second reaction space on its way to the gas outlet of the melt-down reactor. In this second reaction space a hot air blast is blown onto the bath with a similar top blowing technique as in the first reaction space. The hot blast is loaded with fine-grained ore which heats up on contact with the hot air blast. Due to the addition of ore and the top blown preheated air, an iron oxide content comes about in the slag in the area of the bath surface in this second reaction space, which is clearly higher than the iron oxide content of the slag in the area of the bath surface in the first reaction space. The degree of afterburning obtained in the second reaction space is approximately 80%, and approximately 90% of the amount of heat available is transferred to the bath, as in the first reaction space. It has proved useful to introduce inert gas with or without a coal dust load below the bath surface in the area of the second reaction space in order to improve the bath agitation and, related therewith, have a favorable effect on the heat transfer from the second afterburning gas jet.

We claim:

1. A method for melt refining iron ore comprising reducing and melting down the iron ore by introducing carbonaceous fuel into a first reaction zone and at a point beneath the surface of the melt, introducing an ore-free oxidizing gas in the form of a first afterburning gas jet from a first point above the surface of the melt and impinging upon the surface of the melt and introducing an oxidizing gas and at least a portion of the iron ore in the form of a second afterburning gas jet from a second point above the surface of the melt which is spaced from the first point with the second jet impinging upon the surface of the melt at a location which is different from and further from the first reaction zone than the location at which the first jet impinges upon the surface of the melt.

2. In a method for melt reducing iron ore wherein iron ore is reduced and melted down, with energy required for the heat balance of the process generated by adding carbonaceous fuel to the melt and by afterburning the resulting reaction gases, the improvement comprising afterburning the reaction gases at least twice by oxygen-containing gas jets which blow into at least two reaction spaces which are arranged successively in the flow direction of the reaction gases, thereby sucking the gases from the first afterburning stage again into a second oxygen-containing combustion gas jet at the second afterburning stage.

3. A method for melt reducing iron ore comprising reducing and melting the iron ore by reducing carbonaceous fuel into the melt at a first reaction zone of a first reduction potential, introducing an ore-free oxidizing gas in the form of a first afterburning gas jet from a first point above the melt surface and impinging on the melt surface in the first reaction zone to afterburn reaction gases by an afterburning degree of 30 to 50%, and introducing an oxidizing gas and at least a portion of the iron ore in the form of a second afterburning gas jet from a second point above the melt surface and impinging upon the melt surface in a second reaction zone of a lower reduction potential that the first reduction potential to afterburn reaction gases by an afterburning degree of 60 to 100%.

4. Method of claim 2, wherein one of the reaction spaces is located downstream of another reaction space in the direction of flow of the reaction gases.

5. Method of claim 4, wherein the gas jets impinge upon the surface of the melted down, reduced iron ore, and the reduction potential of the downstream gas jet at the point of impact on the melt is less than that of the upstream gas jet.

6. Method of claim 5, wherein strong agitation of the melt is maintained in the area of the reaction space associated with the gas jet having the highest reduction potential.

7. Method of claim 2, wherein the multi-stage afterburning is performed in one vessel.

8. Method of claim 2, wherein the multi-stage afterburning is performed in a plurality of linked vessels.

9. Method of claim 4, wherein ground iron ore is introduced in a downstream afterburning reaction space.

10. Method of claim 4, wherein mass transfer in the liquid phase takes place between two afterburning reaction spaces.

11. Method of claim 5, wherein carbonaceous fuels are introduced into the melt in the first afterburning reaction space and thus in the area of the highest reduction potential.

12. Method of claim 2, wherein the oxygen-containing gas jets impinge the melt surface at an oblique angle.

13. Method of claim 12, wherein two of the gas jets are arranged to be at opposed but not intersecting angles.

14. Method of claim 5, wherein the reaction gases are subjected to a first afterburning of 30 to 50% in the reaction space with the highest reduction potential, and are subjected to a further afterburning of 60 to 100% in the reaction space with the lowest reduction potential.

15. Method of claim 14, wherein preheated air is used as the oxygen-containing gas for the afterburning.

16. Method of claim 2, wherein at least one of the hydrogen-containing gas jets impinges upon the surface of the melted down, reduced iron ore.

17. Method of claim 2, wherein the iron ore is reduced and melted down in a reaction vessel, and the reaction gases are afterburned in the reaction vessel.

* * * * *